(12) United States Patent
King

(10) Patent No.: US 10,783,755 B2
(45) Date of Patent: Sep. 22, 2020

(54) DEVICES AND METHODS FOR GENERATING VIDEO OVERLAY OF TRANSACTION DATA ON AUTOMATED TELLER MACHINE VIDEO

(71) Applicant: Corey T. King, Snohomish, WA (US)

(72) Inventor: Corey T. King, Snohomish, WA (US)

(*) Notice: Subject to any disclaimer, the term of this patent is extended or adjusted under 35 U.S.C. 154(b) by 0 days.

(21) Appl. No.: 16/389,768

(22) Filed: Apr. 19, 2019

(65) Prior Publication Data

US 2019/0325710 A1    Oct. 24, 2019

Related U.S. Application Data

(60) Provisional application No. 62/660,769, filed on Apr. 20, 2018.

(51) Int. Cl.
| | |
|---|---|
| *G06K 7/10* | (2006.01) |
| *H04N 13/183* | (2018.01) |
| *G06K 9/32* | (2006.01) |
| *G07F 19/00* | (2006.01) |
| *H04N 21/81* | (2011.01) |
| *G06F 40/169* | (2020.01) |

(52) U.S. Cl.
CPC .......... *G07F 19/206* (2013.01); *G06F 40/169* (2020.01); *G06K 7/10415* (2013.01); *G06K 9/3266* (2013.01); *G07F 19/203* (2013.01); *G07F 19/211* (2013.01); *H04N 13/183* (2018.05); *H04N 21/8153* (2013.01)

(58) Field of Classification Search
CPC .... G07F 19/203; G07F 19/206; G07F 19/211; G06K 7/10415; H04N 13/183; H04N 21/8153; G06F 40/169

USPC ...................................................... 705/41, 43
See application file for complete search history.

(56) References Cited

U.S. PATENT DOCUMENTS

| | | | | |
|---|---|---|---|---|
| 4,326,221 A | * | 4/1982 | Mallos ............... | H04N 5/23203 348/211.11 |
| 4,660,168 A | * | 4/1987 | Grant ................. | G06Q 10/0631 705/7.12 |
| 4,991,008 A | * | 2/1991 | Nama ................ | G07C 9/00079 235/379 |

(Continued)

*Primary Examiner* — Daniel I Walsh
(74) *Attorney, Agent, or Firm* — Christensen O'Connor Johnson Kindness PLLC

(57) ABSTRACT

Systems and methods for associating automated teller machine (ATM) transaction information with photos and/or videos captured by cameras are provided. In some embodiments, an ATM communicates with a financial institution system via a first network. A video annotation device is communicatively coupled to the first network to receive copies of communications transmitted by the financial institution system to the ATM. The video annotation device extracts annotation information from the communications, and causes the annotation information to be associated with photos and/or videos captured by cameras. In some embodiments, the video annotation device is also communicatively coupled to a second network, and transmits the annotation information to an IP camera for use as on-screen display text. In some embodiments, the video annotation device receives a video signal from a camera, adds an annotation to the video signal, and provides the annotated video signal to a recording device.

12 Claims, 8 Drawing Sheets

(56) References Cited

U.S. PATENT DOCUMENTS

| | | | |
|---|---|---|---|
| 5,491,511 A * | 2/1996 | Odle | G08B 13/19669 348/153 |
| 6,023,688 A | 2/2000 | Ramachandran et al. | |
| 6,400,276 B1 | 6/2002 | Clark | |
| 6,508,397 B1 * | 1/2003 | Do | G07F 19/20 235/379 |
| 6,661,910 B2 | 12/2003 | Jones et al. | |
| 6,704,039 B2 | 3/2004 | Pena | |
| 6,726,094 B1 | 4/2004 | Rantze et al. | |
| 7,015,945 B1 * | 3/2006 | Sullivan | G08B 13/19671 348/150 |
| 7,039,600 B1 | 5/2006 | Meek et al. | |
| 7,304,662 B1 * | 12/2007 | Sullivan | G07F 19/20 348/150 |
| 7,389,914 B1 * | 6/2008 | Enright | G06Q 20/042 235/379 |
| 7,416,112 B2 | 8/2008 | Smith et al. | |
| 7,469,824 B1 * | 12/2008 | Crews | G06Q 20/042 235/379 |
| 7,549,574 B2 * | 6/2009 | Crowell | G06Q 20/1085 235/375 |
| 7,624,919 B2 | 12/2009 | Meek et al. | |
| 7,631,808 B2 | 12/2009 | Kundu et al. | |
| 7,832,632 B2 | 11/2010 | Meek et al. | |
| 7,883,009 B2 | 2/2011 | Meek et al. | |
| 7,925,536 B2 * | 4/2011 | Lipton | G06Q 20/20 705/16 |
| 7,942,313 B1 * | 5/2011 | Grimm | G06Q 20/042 235/375 |
| 7,942,314 B1 | 5/2011 | Grimm et al. | |
| 7,946,476 B1 | 5/2011 | Grimm et al. | |
| 8,032,667 B2 * | 10/2011 | Takei | G06Q 20/105 235/380 |
| 8,132,725 B2 | 3/2012 | Kundu et al. | |
| 8,235,283 B2 | 8/2012 | Meek et al. | |
| 8,302,856 B1 | 11/2012 | Grimm et al. | |
| 8,317,087 B1 * | 11/2012 | Crews | G07F 19/205 235/379 |
| 8,336,769 B2 | 12/2012 | Meek et al. | |
| 8,381,970 B2 | 2/2013 | Meek et al. | |
| 8,396,766 B1 | 3/2013 | Enright et al. | |
| 8,474,704 B1 | 7/2013 | Grimm et al. | |
| 8,511,546 B2 | 8/2013 | Meek et al. | |
| 8,538,820 B1 * | 9/2013 | Migdal | H04N 7/18 348/153 |
| 8,570,375 B1 * | 10/2013 | Srinivasan | G06Q 20/20 235/383 |
| 8,584,935 B2 | 11/2013 | Meek et al. | |
| 8,640,946 B1 * | 2/2014 | Block | G06Q 20/1085 235/379 |
| 8,651,373 B1 * | 2/2014 | Block | G06Q 20/1085 235/379 |
| 8,701,990 B2 | 4/2014 | Meek et al. | |
| 8,833,653 B2 | 9/2014 | Kundu et al. | |
| 9,004,353 B1 * | 4/2015 | Block | G06Q 20/1085 235/379 |
| 9,202,117 B2 | 12/2015 | Kundu et al. | |
| 9,277,185 B2 | 3/2016 | Lipton et al. | |
| 9,530,132 B2 | 12/2016 | Cox | |
| 9,734,673 B2 | 8/2017 | Priesterjahn et al. | |
| 9,846,996 B1 * | 12/2017 | Moore | G07F 19/209 |
| 10,311,646 B1 * | 6/2019 | Wurmfeld | G06T 19/006 |
| 10,331,874 B1 * | 6/2019 | Benkreira | G07F 7/1041 |
| 2002/0026426 A1 | 2/2002 | Bennett | |
| 2002/0105665 A1 | 8/2002 | Wasilewski et al. | |
| 2004/0024709 A1 * | 2/2004 | Yu | G06Q 20/105 705/43 |
| 2004/0155960 A1 * | 8/2004 | Wren | G07G 1/14 348/150 |
| 2005/0171907 A1 | 8/2005 | Lewis | |
| 2005/0177859 A1 | 8/2005 | Valentino, III et al. | |
| 2006/0193004 A1 | 8/2006 | Wasilewski et al. | |
| 2007/0131757 A1 * | 6/2007 | Hamilton | G06Q 20/1085 235/379 |
| 2008/0208698 A1 * | 8/2008 | Olson | G06Q 20/20 705/21 |
| 2009/0087160 A1 * | 4/2009 | Lui | G06F 17/241 386/282 |
| 2009/0150246 A1 | 6/2009 | Meenakshi et al. | |
| 2009/0201372 A1 * | 8/2009 | O'Doherty | G07F 19/20 348/150 |
| 2009/0244285 A1 * | 10/2009 | Chathukutty | G07F 19/207 348/150 |
| 2010/0102511 A1 * | 4/2010 | Tammesoo | G07F 17/32 273/292 |
| 2010/0238286 A1 * | 9/2010 | Boghossian | G06K 9/00771 348/143 |
| 2011/0035240 A1 | 2/2011 | Joao | |
| 2011/0264586 A1 | 10/2011 | Boone et al. | |
| 2012/0078667 A1 * | 3/2012 | Denker | G06Q 10/02 705/5 |
| 2012/0185318 A1 * | 7/2012 | Shipley | G06Q 30/02 705/14.26 |
| 2013/0227594 A1 | 8/2013 | Boone et al. | |
| 2015/0058159 A1 * | 2/2015 | Balram | G06F 21/32 705/26.7 |
| 2016/0072915 A1 * | 3/2016 | Decanne | G06F 16/583 715/728 |
| 2016/0098692 A1 * | 4/2016 | Johnson | G07G 1/01 705/43 |
| 2016/0098709 A1 * | 4/2016 | Johnson | G07F 19/20 705/43 |
| 2018/0300720 A1 * | 10/2018 | Tanaka | G06Q 20/1085 |
| 2019/0325710 A1 * | 10/2019 | King | G07F 19/211 |

* cited by examiner

DEVICES AND METHODS FOR GENERATING VIDEO OVERLAY OF TRANSACTION DATA ON AUTOMATED TELLER MACHINE VIDEO

CROSS-REFERENCE(S) TO RELATED APPLICATION(S)

This application claims the benefit of Provisional Application No. 62/660,769, filed Apr. 20, 2018, the entire disclosure of which is hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system is provided. The system comprises an automated teller machine (ATM), a first network that communicatively couples the ATM to a financial system, an IP camera device, a second network that is communicatively coupled to the IP camera and separate from the first network, and a video annotation device. The video annotation device is communicatively coupled to the first network to receive information addressed to the ATM, and is communicatively coupled to the IP camera device via the second network.

In some embodiments, a method is provided. A computing device monitors automated teller machine (ATM) transaction information. The computing device generates on-screen display information based on the ATM transaction information. The computing device causes the on-screen display information to be added to a video or a still image snapshot associated with the ATM transaction information.

In some embodiments, a non-transitory computer-readable medium is provided. The computer-readable medium has computer-executable instructions stored thereon. The instructions, in response to execution by one or more processors of a computing device, cause the computing device to perform actions comprising monitoring communication signals addressed to an automated teller machine (ATM) on a first network, and generating annotation information based on the communication signals.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
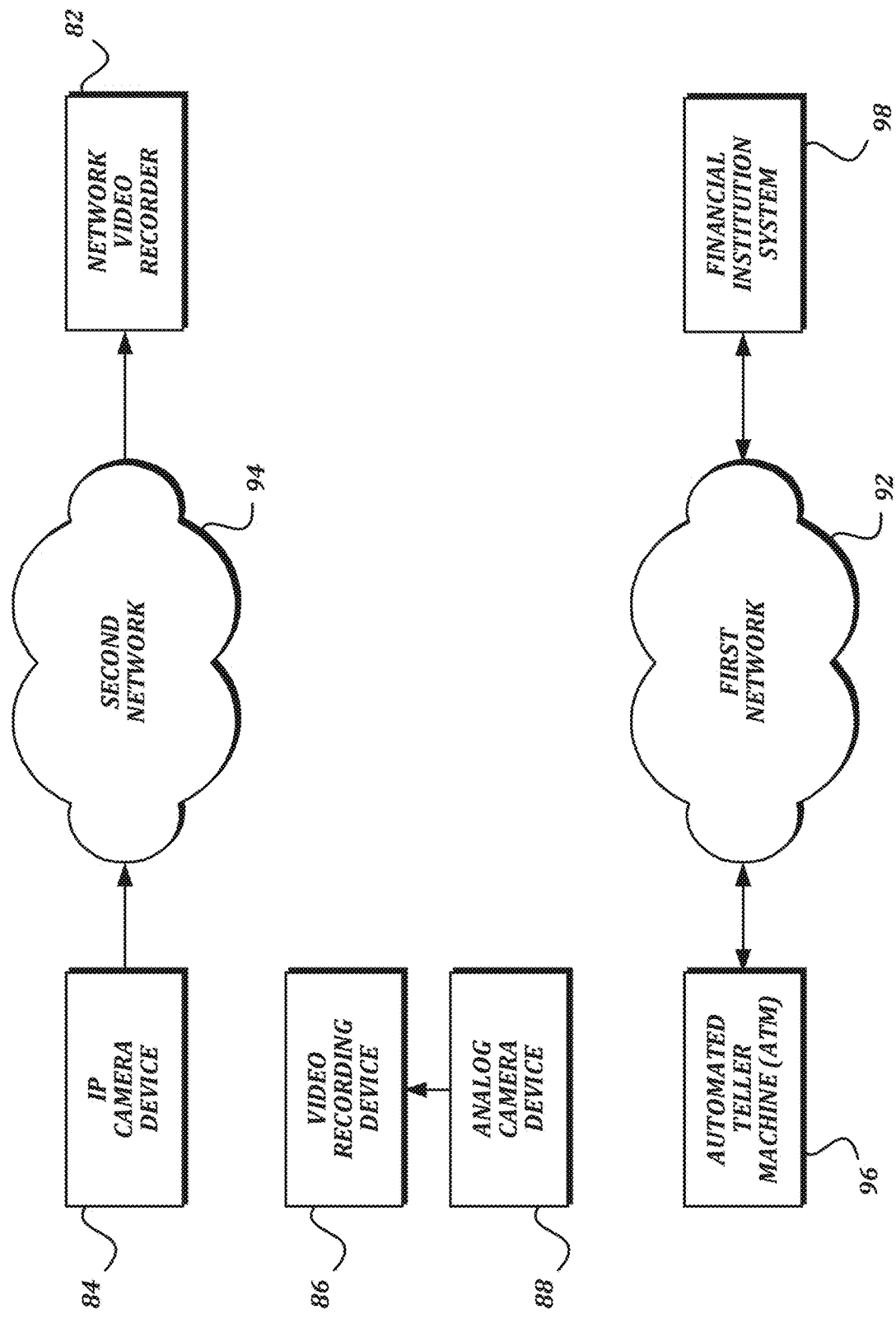
FIG. 1 is a schematic diagram that illustrates a traditional system for performing and monitoring automated teller machine transactions.

Automated teller machines, or ATMs, are becoming the predominant way in which individuals conduct transactions with financial institutions such as banks. While the convenience provided by ATMs is a benefit of the technology, the locations of ATMs are often not as secure as a bank lobby. Accordingly, various steps are generally taken in order to monitor the locations of ATMs for malicious activity. FIG. 1 is a schematic diagram that illustrates a traditional system for performing and monitoring automated teller machine transactions. In the system 100, the ATM 96 communicates with a financial institution system 98 via a first network 92. The financial institution system 98 includes one or more computing devices that manage the accounts of customers, communicate with other financial institution systems, and perform other traditional financial account management tasks. The communication between the ATM 96 and the financial institution system 98 includes the ATM 96 transmitting requests to the financial institution system 98 (such as account inquiries, cash withdrawal requests, deposit requests, and transfer requests), and the financial institution system 98 responds with commands to the ATM 96 (such as amounts of currency to dispense and information to present).

For monitoring purposes, one or more camera devices are positioned such that their field of view captures activities that occur near the ATM 96. As shown, an analog camera device 88 and/or an Internet Protocol (IP) camera device 84 may be so positioned. Some cameras 84, 86 may be positioned within a cabinet of the ATM 96 so as to capture a face of a user of the ATM 96. Some cameras 84, 86 may be positioned away from the ATM 96 and may be directed toward the ATM 96 in order to capture a profile view of a user of the ATM 96. The analog camera device 88 may be coupled to a video recording device 86 via component video or composite video cables, and the video recording device 86 may record video generated by the analog camera device 88 in a suitable format and on a suitable medium. The IP camera device 84 may be communicatively coupled to a network video recorder 82 via a second network 94, and the network video recorder 82 may record video generated by the IP camera device 84 and transmitted over the second network 94.

The first network 92 and the second network 94 may each include any suitable communication technology, including but not limited to Ethernet, fiber optics, Wi-Fi, WiMAX, 2G, 3G, 4G, LTE, modem communication over a telephony network, and the Internet. In some embodiments, the first network 92 and the second network 94 may be completely isolated from each other, and may not share any common resources such as transmission wires or access points. In some embodiments, some portions of the first network 92 and the second network 94 may share some hardware (such as separate subnets connected by a shared router), but devices on the second network 94 may nevertheless be prevented from communicating with devices on the first network 92 for security purposes. In some embodiments, the first network 92 may be a 100M Ethernet network, and the second network 94 may be a gigabit Ethernet network.

Figure 2:
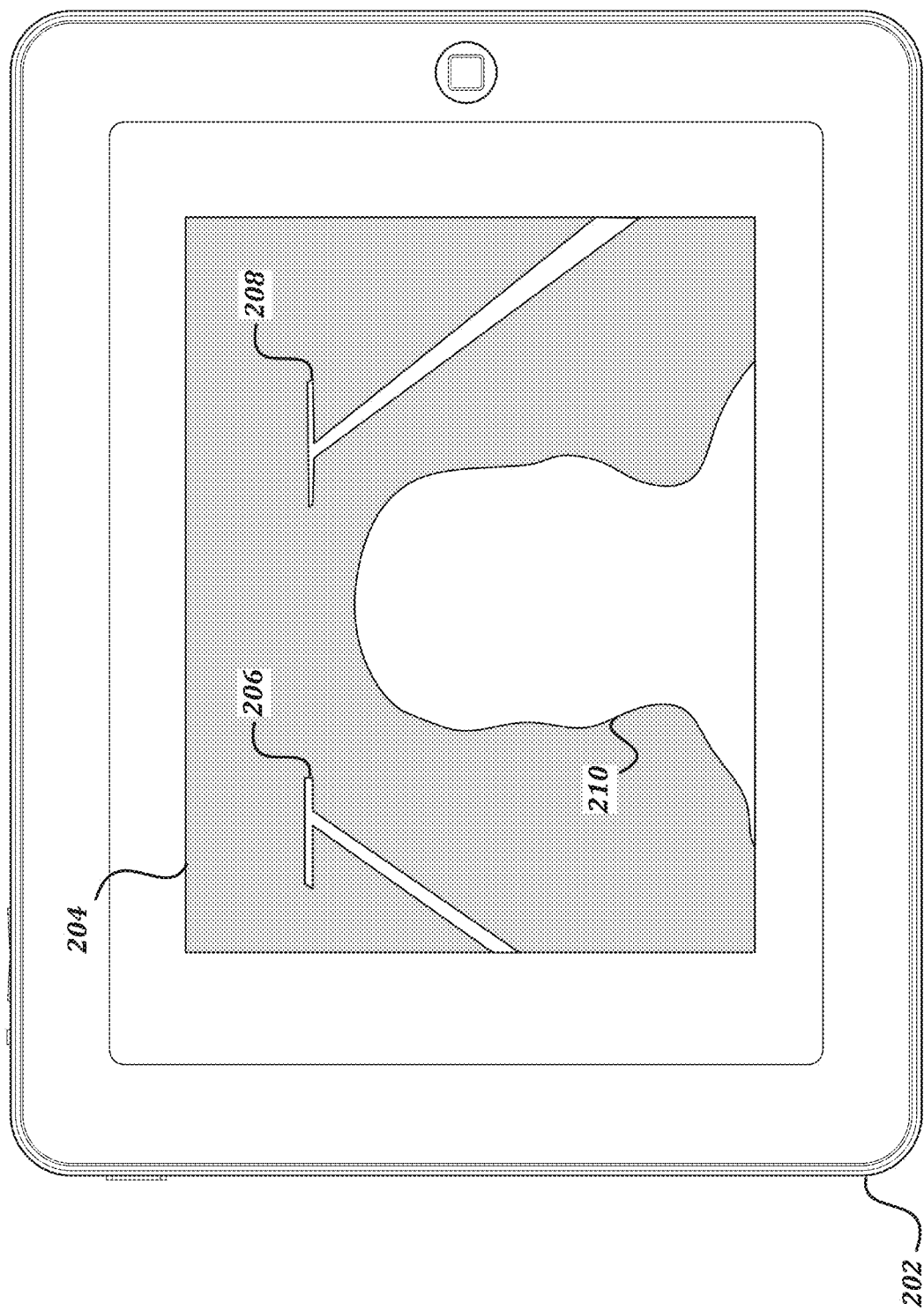
FIG. 2 illustrates an example image from a video of an automated teller machine transaction captured by the traditional system.

FIG. 2 illustrates an example image from a video of an automated teller machine transaction captured by the traditional system. In the illustrated embodiment, the image 204 is being presented by a tablet computing device 202, which may be communicating directly with an IP camera device 84, or may be retrieving an image or video signal from the network video recorder 82 or the video recording device 86. The illustrated image 204 is from the point of view of a camera device 84, 88 installed within or near a cabinet of the ATM 96. Accordingly, some environmental features such as lines 206, 208 painted in a parking lot are visible, as is a face 210 of a person standing in front of the ATM 96.

While capturing a face 210 of a person standing in front of the ATM 96 can be useful in fraud prevention and theft prevention, the traditional system 100 has technical drawbacks. For example, the image 204 cannot easily be correlated to a transaction that was occurring at the time the image 204 was captured. Even if a timestamp generated by the camera device 84, 88 for the image 204 was accurately correlated with a timestamp of financial records generated by the financial institution system 98, it is unlikely that a reviewer of the image 204 has access to the financial records stored by the financial institution system 98, both because providing such access would raise security/privacy concerns, and because the video recording device 86, the network video recorder 82, and the IP camera device 84 are walled off from the first network 92 and therefore cannot access such information. What is desired are techniques for making transaction information available while reviewing images or videos captured by camera devices 84, 88, while retaining the security and privacy offered by the separation of the first network 92 and the second network 94.

Figure 3:
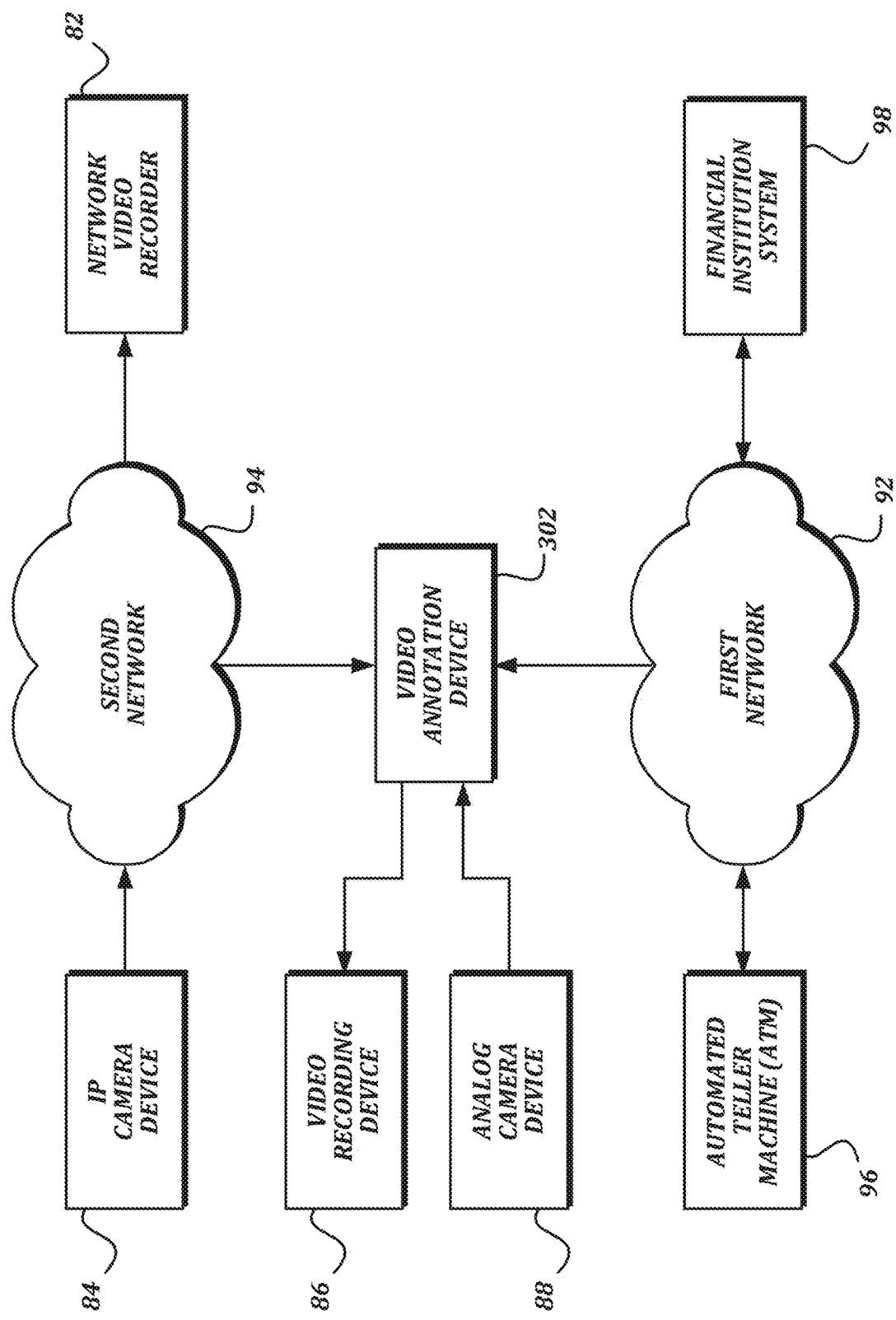
FIG. 3 is a schematic diagram that illustrates a non-limiting example embodiment of an enhanced system for performing and monitoring automated teller machine transactions according to various aspects of the present disclosure.

FIG. 3 is a schematic diagram that illustrates a non-limiting example embodiment of an enhanced system for performing and monitoring automated teller machine transactions according to various aspects of the present disclosure. As with the traditional system 100 illustrated in FIG. 1, the system 300 includes an ATM 96 and a financial institution system 98 communicatively coupled by a first network 92. The system 300 also includes an analog camera device 88, a video recording device 86, and an IP camera device 84 communicatively coupled to a network video recorder 82 via a second network 94. Because these components are similar to the like-numbered components in FIG. 1, the detailed description of these components is not repeated here for the sake of brevity.

Unlike the traditional system 100, the system 300 includes a video annotation device 302. The video annotation device 302 includes a first network interface that is coupled to the first network 92, and listens to network traffic between the ATM 96 and the financial institution system 98. From this network traffic, the video annotation device 302 extracts information about transactions occurring using the ATM 96, and generates annotations based on the information.

In some embodiments, the analog camera device 88 provides a video signal to the video annotation device 302. The video annotation device 302 then updates the video signal with an annotation, and provides the updated video signal to the video recording device 86. In some embodiments, the video annotation device 302 includes a second network interface that is coupled to the second network 94. The video annotation device 302 can then transmit annotation information to the IP camera device 84 to be added to a digital video signal as on-screen display (OSD) information. The video annotation device 302 may also retrieve video clips or snapshots from the IP camera device 84 for storage on the video annotation device 302 along with the annotation information.

Further details of the components of the system 300 are provided below.

Figure 4:
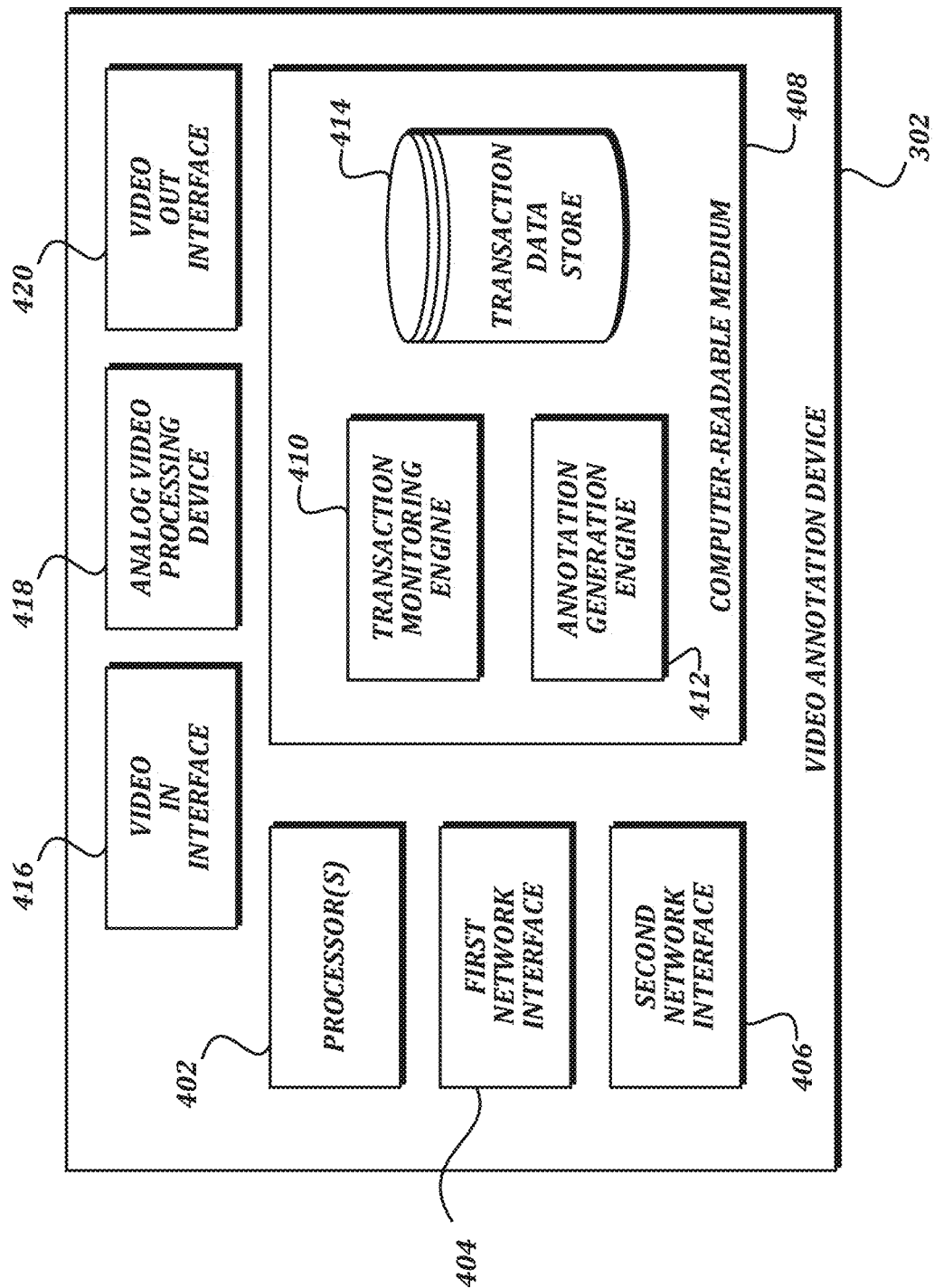
FIG. 4 is a block diagram that illustrates some components of a non-limiting example embodiment of a video annotation device according to various aspects of the present disclosure.

FIG. 4 is a block diagram that illustrates some components of a non-limiting example embodiment of a video annotation device according to various aspects of the present disclosure. In some embodiments, the video annotation device 302 is a custom-built computing device that is configured to include the illustrated components in a form factor that is compact and suitable for secure installation in a location that has physical access to the first network 92 and the second network 94. In some embodiments, the video annotation device 302 may be a general purpose computing device, such as a laptop computing device, a rack-mount computing device, a desktop computing device, or a server computing device, that is configured to include the illustrated components.

As shown, the video annotation device 302 includes one or more processors 402, a first network interface 404, a second network interface 406, a video in interface 416, an analog video processing device 418, a video out interface 420, and a non-transitory computer-readable medium 408.

In some embodiments, the one or more processors 402 may include any type of commercially available computer processor. In some embodiments, the first network interface 404 and the second network interface 406 may include hardware and associated software and/or firmware for connecting to suitable networking technologies, including but not limited to wired technologies (including but not limited to Ethernet, USB, FireWire, fiber optic, and serial communication) and/or wireless technologies (including but not limited to 2G, 3G, 4G, LTE, Wi-Fi, WiMAX, and Bluetooth). As one non-limiting example, the first network interface 404 may include a first RJ-45 socket to accept a cable coupled to the first network 92, and the second network interface 406 may include a second RJ-45 socket to accept a cable coupled to the second network 94.

In some embodiments, the video in interface 416 includes a connector such as an RCA socket or jack configured to be coupled via a coaxial cable to an output of an analog camera device 88. The signal received via the video in interface 416 is provided to the analog video processing device 418, which may be an integrated circuit, processor, or other circuitry configured to process the video signal as described below. In some embodiments, the video out interface 420 includes another connector such as an RCA socket or jack configured to be coupled via a coaxial cable to an input of the video recording device 86. The signal processed by the analog video processing device 418 is provided to the video recording device 86 via the video out interface 420. Though the analog camera device 88, the video in interface 416, the video out interface 420, and the video recording device 86 are described as relating to "analog" video, in some embodiments, these components provide video in another format, such as digital, over similar direct-wired video connections. For example, the connection between the analog camera device 88 and the video annotation device 302 (and the connection between the video annotation device 302 and the video recording device 86) may be via a DVI connection, a DisplayPort connection, an HDMI connection, or another type of video transfer technology.

In some embodiments, the computer-readable medium 408 may include one or more computer-readable media that use any suitable technology, including but not limited to a hard drive, a flash drive, an optical drive, an EEPROM, and RAM. As shown, the computer-readable medium 408 has computer-executable instructions stored thereon that, in response to execution by the one or more processors 402, cause the video annotation device 302 to provide a transaction monitoring engine 410 and an annotation generation engine 412.

In some embodiments, the transaction monitoring engine 410 monitors communication traffic on the first network 92 to detect transactions at the ATM 96. In some embodiments, the annotation generation engine 412 uses transaction information detected by the transaction monitoring engine 410 to create annotations to be added to or stored with data generated by the analog camera device 88 and/or the IP camera device 84. As shown, the computer-readable medium 408 also stores thereon a transaction data store 414. In some embodiments, the transaction data store 414 is configured to store copies of data generated by the analog camera device 88 and/or the IP camera device 84, either as updated with the annotations, or along with the annotation information.

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub engines. The engines can be stored in any type of computer readable medium or computer storage device and be stored on and executed by one or more general purpose computers, thus creating a special purpose computer configured to provide the engine or the functionality thereof.

A "data store" as described herein may be any suitable device configured to store data for access by a computing device. One example of a data store is a highly reliable, high-speed relational database management system (DBMS) executing on one or more computing devices. Another example of a data store is a key-value store. However, any other suitable storage technique and/or device capable of quickly and reliably providing the stored data in response to queries may be used, and the computing device may be accessible over a network instead of locally, or may be provided as a cloud-based service. A data store may also include data stored in an organized manner on a computer-readable storage medium, as described further below. The single data store described herein may be divided into multiple data stores or may be stored on multiple computer-readable media without departing from the scope of the present disclosure.

In some embodiments, the video annotation device 302 may include other components. For example, the video annotation device 302 may include a power source such as a 12V 2.0A wall power supply or a Power over Ethernet (PoE) interface. As another example, the video annotation device 302 may include a user interface engine that generates a user interface through which information stored within the transaction data store 414 can be searched, browsed, viewed, downloaded, and/or otherwise managed. In some embodiments, the video annotation device 302 may include multiple interfaces to allow connections to multiple different types of networks, camera devices, and/or recording devices, either concurrently or at different times. For example, a single video annotation device 302 may include RCA video in/out interfaces along with HDMI video in/out interfaces, and may include RJ-45 network interfaces along with USB interfaces and/or wireless interfaces.

Figure 5A:
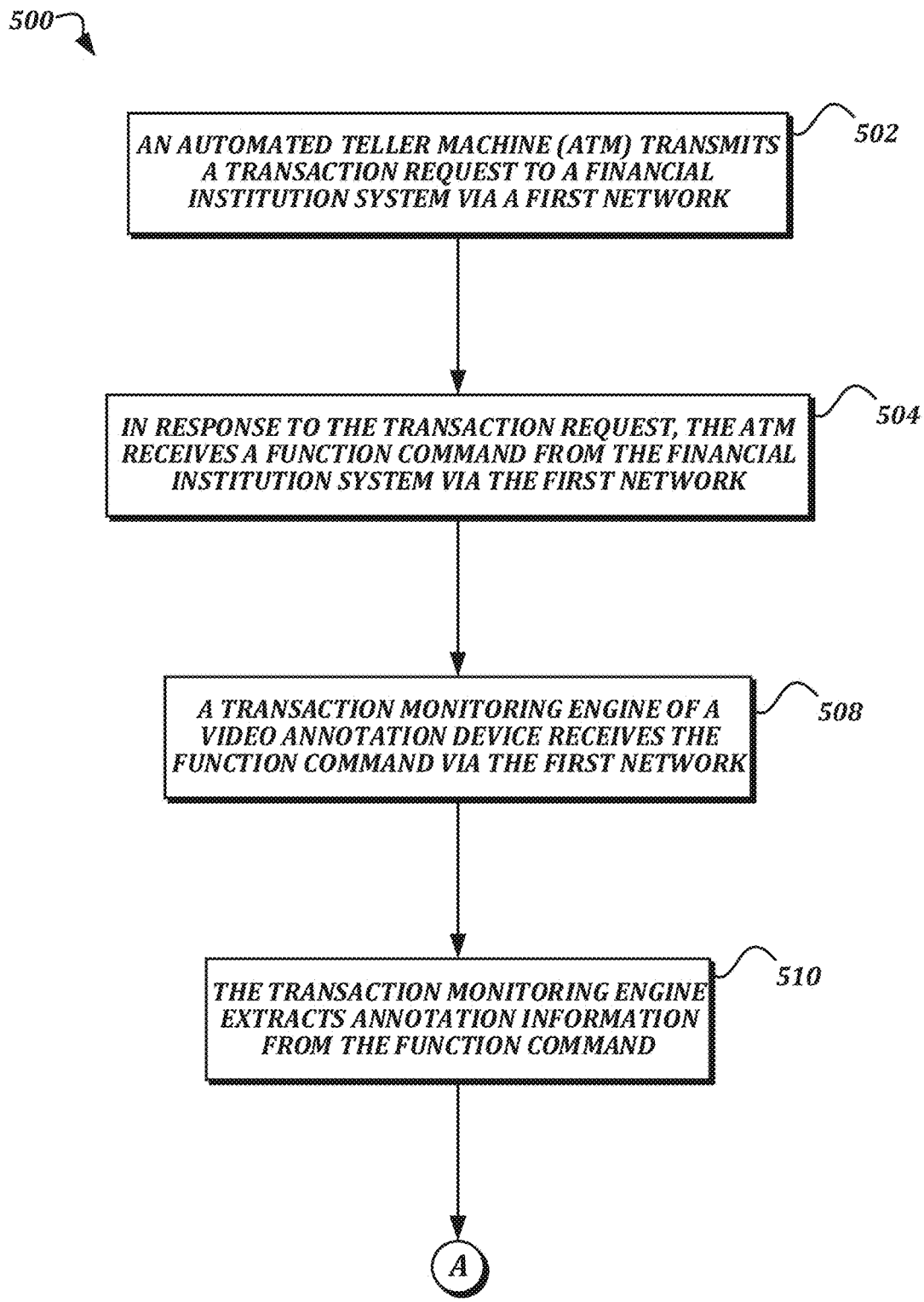
FIGS. 5A-5B are a flowchart that illustrates a non-limiting example embodiment of a method of generating annotations for video and/or photographs taken in association with ATM transactions according to various aspects of the present disclosure.
Figure 5B:
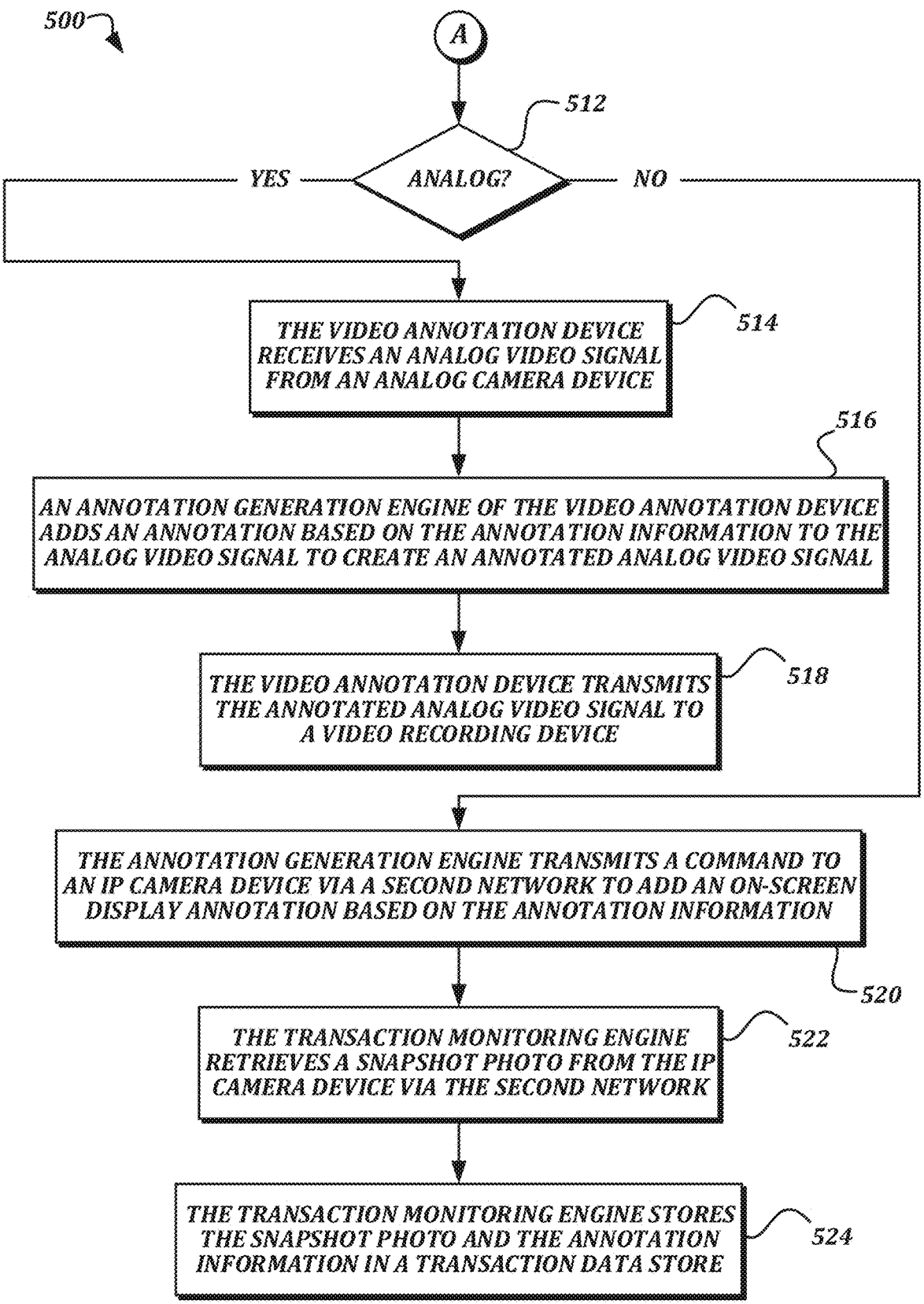

FIGS. 5A-5B are a flowchart that illustrates a non-limiting example embodiment of a method of generating annotations for video and/or photographs taken in association with ATM transactions according to various aspects of the present disclosure. At block 502, an automated teller machine (ATM) 96 transmits a transaction request to a financial institution system 98 via a first network 92. In some embodiments, the ATM 96 may use a standard protocol, including but not limited to a Diebold 910/911 protocol, a Diebold 903/906/912 protocol, a Diebold Native protocol, an NCR 910/911 protocol, an NCR 903/906/912 protocol, an NCR Native protocol, an ISO 8583 protocol, or an IFX protocol, to communicate with the financial institution system 98. In some embodiments, the transaction request may include one or more of an account inquiry, a deposit request, a cash withdrawal request, and a transfer request.

At block 504, in response to the transaction request, the ATM 96 receives a function command from the financial institution system 98 via the first network 92. As with the transaction request, the function command may use a standard protocol such as the protocols listed above. In some embodiments, the function command includes instructions to the ATM 96 that cause the ATM 96 to perform actions such as dispensing an instructed amount of currency and/or presenting information to the user. In some embodiments, the function command also includes information describing the transaction. For example, the function command may include "receipt text," which is a plain-text listing of information relevant to the transaction to print on a receipt.

At block 508, a transaction monitoring engine 410 of a video annotation device 302 receives the function command via the first network 92. In some embodiments, the function command may be addressed to the ATM 96 using an internet protocol (IP) address or a media access control (MAC) address that uniquely identifies the ATM 96. As with other IP-based communication, packets intended for the ATM 96 are transmitted on the physical layer of the first network 92, and include the MAC address and/or IP address of the ATM 96 as a destination address in a header portion. Though any device coupled to the first network 92 on the same subnet as the ATM 96 would be able to see the packets traversing the physical layer, only the ATM 96 would typically process the packets due to the addressing. In some embodiments, the transaction monitoring engine 410 is configured during setup of the system 300 to be aware of the MAC address and/or the IP address of the ATM 96, and the transaction monitoring engine 410 reviews packets addressed to the MAC address and/or the IP address of the ATM 96 to look for function commands. When such packets are identified, the transaction monitoring engine 410 receives the packets in order to process the information there. In some embodiments, the first network interface 404 is placed in "promiscuous mode" so that packets or frames addressed to the ATM 96 are not dropped before being passed to the transaction monitoring engine 410 for processing. In some embodiments, a network switch to which both the video annotation device 302 and the ATM 96 are communicatively coupled may be configured during setup of the system 300 to provide network traffic addressed to the ATM 96 to both the ATM 96 and the video annotation device 302.

At block 510, the transaction monitoring engine 410 extracts annotation information from the function command. In some embodiments, the annotation information may be retrieved from the receipt text, which may be detected between standard field separators within the function command. In some embodiments, the annotation information may include additional information other than that found in the receipt text, including but not limited to an account number, an account name, a timestamp, and information identifying the ATM 96 or the video annotation device 302.

The method 500 proceeds to a continuation terminal ("terminal A"). From terminal A (FIG. 5B), the method 500 proceeds to a decision block 512. At decision block 512, a determination is made regarding whether an annotation will be added to an analog video signal or to digital video data. In some embodiments, the determination may be made based on detecting whether or not an analog camera device 88 is coupled to the video annotation device 302, and/or whether or not the video annotation device 302 has been configured to communicate with an IP camera device 84. Though the method 500 is illustrated with analog and digital options being alternatives, in some embodiments, annotations may be added to both analog video signals and digital video data for a single transaction.

If it is determined that the annotation will be added to an analog video signal, then the result of decision block 512 is YES. At block 514, the video annotation device 302 receives an analog video signal from an analog camera device 88. At block 516, an annotation generation engine 412 of the video annotation device 302 adds an annotation based on the annotation information to the analog video signal to create an annotated analog video signal. The annotation generation engine 412 may generate the annotation based on the annotation information extracted by the transaction monitoring engine 410, and the annotation may actually be added to the video signal by the analog video processing device 418. In some embodiments, the annotation is added as a text overlay, within a closed caption signal, or in any other suitable format. In some embodiments, the annotation generation engine 412 may also store a digital copy of a portion of the analog video signal, such as a 10-second clip or a snapshot, in the transaction data store 414, either with the annotation applied or in association with the annotation information. At block 518, the video annotation device 302 transmits the annotated analog video signal to a video recording device 86. The video recording device 86 stores the annotated analog video signal using any suitable technique.

In some embodiments, instead of processing the video using the analog video processing device 418, the video annotation device 302 may be communicatively coupled to the video recording device 86 via a data connection such as a USB connection or a serial connection. In such embodiments, instead of processing the video to add the annotation at block 516, the annotation generation engine 412 may transmit the annotation information via the data connection to the video recording device 86, and the video recording device 86 may add the annotation to the video.

Returning to decision block 512, if it is determined that the annotation will be added to digital video data, then the result of decision block 512 is NO. At block 520, the annotation generation engine 412 transmits a command to an IP camera device 84 via a second network 94 to add an on-screen display annotation based on the annotation information. In some embodiments, the annotation generation engine 412 may transmit a command using the ONVIF standard to indicate that the annotation information should be added as on-screen display (OSD) text to the video being captured by the IP camera device 84.

At block 522, the transaction monitoring engine 410 retrieves a snapshot photo from the IP camera device 84 via the second network 94. The snapshot photo may be retrieved using the ONVIF video standard, or using any other technique to communicate with the IP camera device 84. At block 524, the transaction monitoring engine 410 stores the snapshot photo and the annotation information in a transaction data store 414. The annotation information may be applied to the snapshot photo, or may be stored in association with the snapshot photo. In some embodiments, instead of or in addition to retrieving a snapshot photo, the transaction monitoring engine 410 may retrieve a video clip (such as a ten-second video clip).

Figure 6:
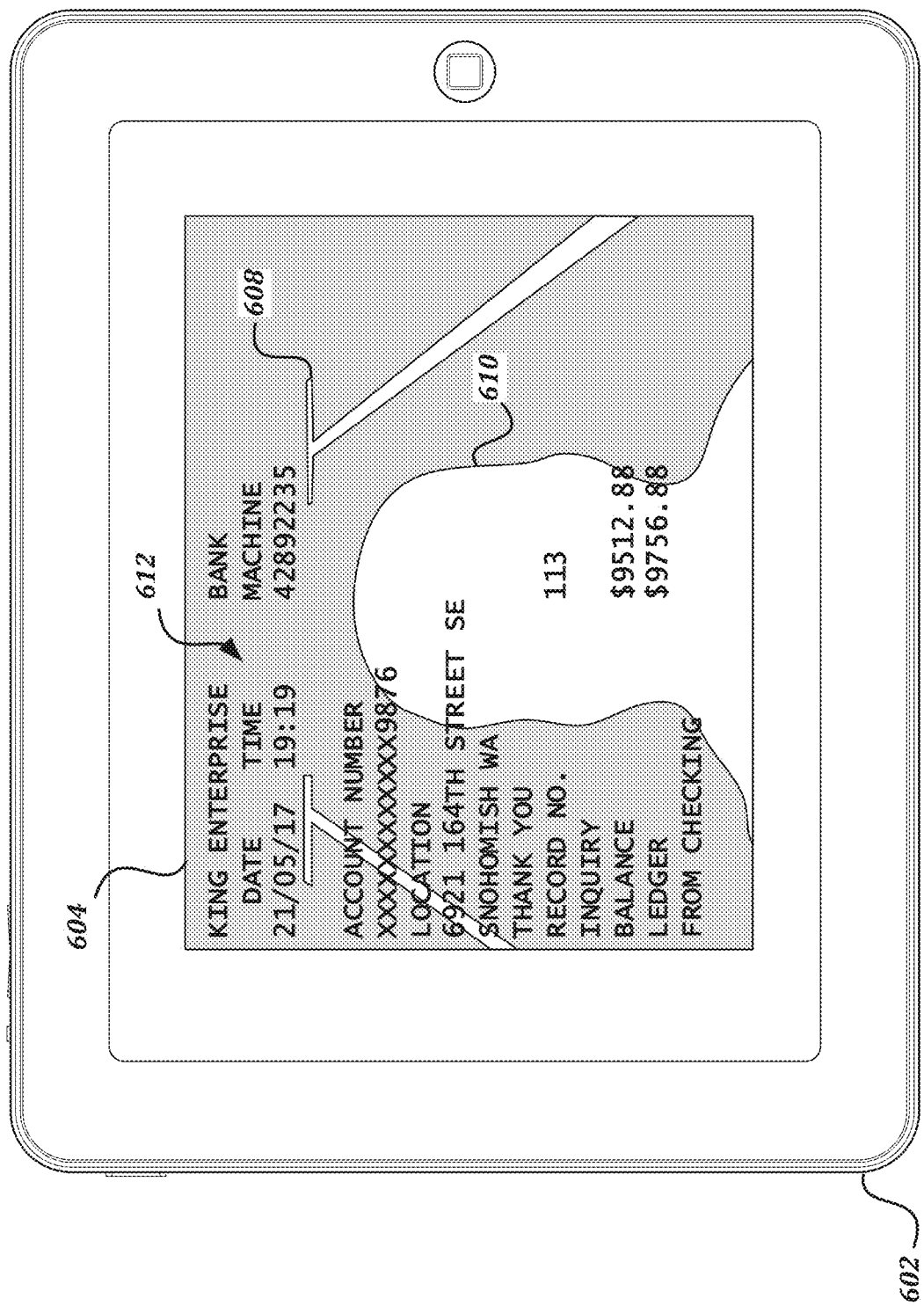
FIG. 6 illustrates a non-limiting example embodiment of an image from a video of an automated teller machine transaction captured by the enhanced system according to various aspects of the present disclosure.

FIG. 6 illustrates a non-limiting example embodiment of an image from a video of an automated teller machine transaction captured by the enhanced system according to various aspects of the present disclosure. As with the example image illustrated in FIG. 2, the image 604 is being presented by a tablet computing device 602, which may be communicating directly with the IP camera device 84, the network video recorder 82, or the video recording device 86. The tablet computing device 602 may also be communicating with the video annotation device 302, which may store copies of the video, snapshots, and/or annotations in its transaction data store 414. The image 604 is again from the point of view of a camera device 84, 88 installed within or near a cabinet of the ATM 96, and shows environmental features such as lines 608 painted in a parking lot, and a face 610 of a person standing in front of the ATM 96. Newly visible in the image 604 is the annotation text 612, which may be stored as part of the image 604.

Figure 7:
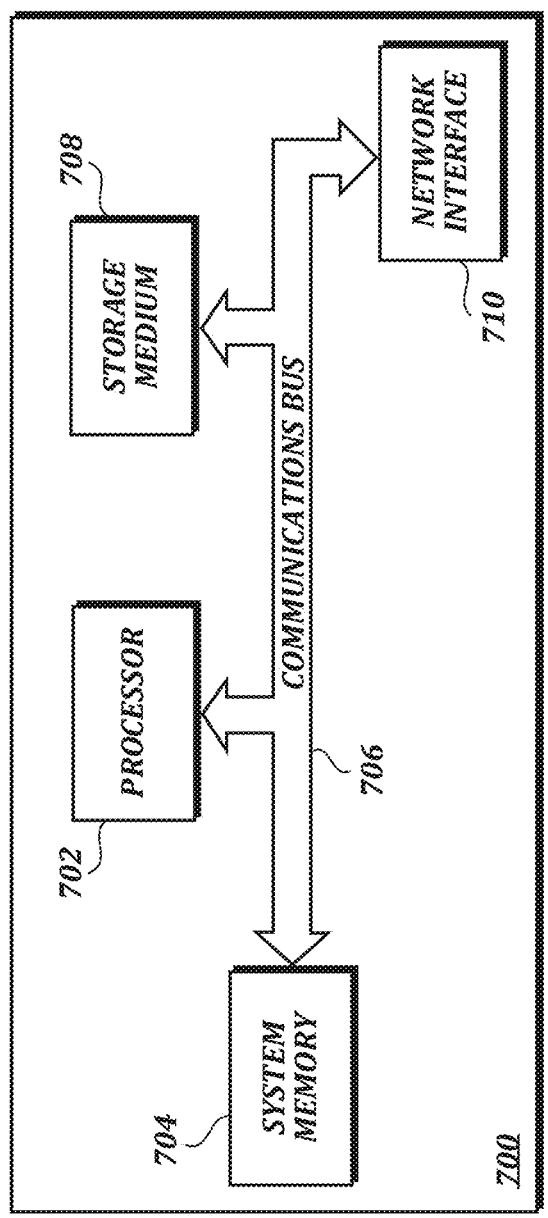
FIG. 7 is a block diagram that illustrates aspects of an exemplary computing device appropriate for use with embodiments of the present disclosure.

FIG. 7 is a block diagram that illustrates aspects of an exemplary computing device appropriate for use with embodiments of the present disclosure. While FIG. 7 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 700 may be any one of any number of currently available or yet to be developed devices.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or similar memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 7, the computing device 700 also includes a storage medium 708. However, services may be accessed using a computing device that does not include means for persisting data to a local storage medium. Therefore, the storage medium 708 depicted in FIG. 7 is represented with a dashed line to indicate that the storage medium 708 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 704 and storage medium 708 depicted in FIG. 7 are merely examples of computer-readable media.

Suitable implementations of computing devices that include a processor 702, system memory 704, communication bus 706, storage medium 708, and network interface 710 are known and commercially available. For ease of illustration and because it is not important for an understanding of the claimed subject matter, FIG. 7 does not show some of the typical components of many computing devices. In this regard, the computing device 700 may include input devices, such as a keyboard, keypad, mouse, microphone, touch input device, touch screen, tablet, and/or the like. Such input devices may be coupled to the computing device 700 by wired or wireless connections including RF, infrared, serial, parallel, Bluetooth, USB, or other suitable connections protocols using wireless or physical connections. Similarly, the computing device 700 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system, comprising:
   an automated teller machine (ATM);
   a first network that communicatively couples the ATM to a financial system;
   an IP camera device;
   a second network that is communicatively coupled to the IP camera and separate from the first network; and
   a video annotation device that is communicatively coupled to the first network to receive information addressed to the ATM, and that is communicatively coupled to the IP camera device via the second network;
   wherein the video annotation device is configured to:
      monitor communication signals on the first network addressed to the ATM;
      generate annotation information based on the communication signals; and
      transmit a command to the IP camera device via the second network to add an annotation based on the annotation information to video data or a photo captured by the IP camera device.

2. The system of claim 1, wherein the first network is a 100M network, and wherein the second network is a gigabit Ethernet network.

3. The system of claim 1, further comprising:
   an analog camera device coupled to a video in interface of the video annotation device; and
   a video recording device coupled to a video out interface of the video annotation device.

4. The system of claim 1, wherein the command to the IP camera device is an ONVIF command to add an on-screen display (OSD) that includes the annotation.

5. The system of claim 1, wherein monitoring communication signals on the first network addressed to the ATM includes detecting a function command addressed to the ATM.

6. The system of claim 5, wherein generating annotation information based on the communication signals includes extracting receipt text from the function command.

7. A non-transitory computer-readable medium having computer-executable instructions stored thereon that, in response to execution by one or more processors of a video annotation device, cause the video annotation device to perform actions comprising:
   monitoring communication signals addressed to an automated teller machine (ATM) on a first network, wherein the first network communicatively couples the ATM to a financial system, and wherein monitoring communication signals includes receiving information addressed to the ATM via the first network;
   generating annotation information based on the communication signals by extracting information between field separators of the information addressed to the ATM;
   transmitting a command to an IP camera device via a second network to cause the IP camera to add an annotation based on the annotation information to video data or a photo captured by the IP camera device, wherein the second network is separate from the first network and communicatively couples the video annotation device to the IP camera device;
   receiving the annotated video data or photo from the IP camera device via the second network; and
   storing the annotated video data or photo in a memory of the video annotation device.

8. The computer-readable medium of claim 7, wherein transmitting the command to an IP camera device includes transmitting an ONVIF command to add an on-screen display (OSD) that includes the annotation.

9. The computer-readable medium of claim 7, wherein monitoring communication signals addressed to the ATM on the first network includes detecting a function command addressed to the ATM.

10. The computer-readable medium of claim 9, wherein generating annotation information based on the communication signals includes extracting receipt text from the function command.

11. The computer-readable medium of claim 7, wherein monitoring communication signals addressed to the ATM includes detecting signals transmitted on the first network that include a MAC address or an IP address of the ATM as a destination address.

12. The computer-readable medium of claim 7, wherein the actions further comprise storing the annotation information in a transaction data store.

* * * * *